Nov. 10, 1953  G. B. HANSBURG  2,658,204
BATHTUB
Filed June 13, 1949 2 Sheets-Sheet 1
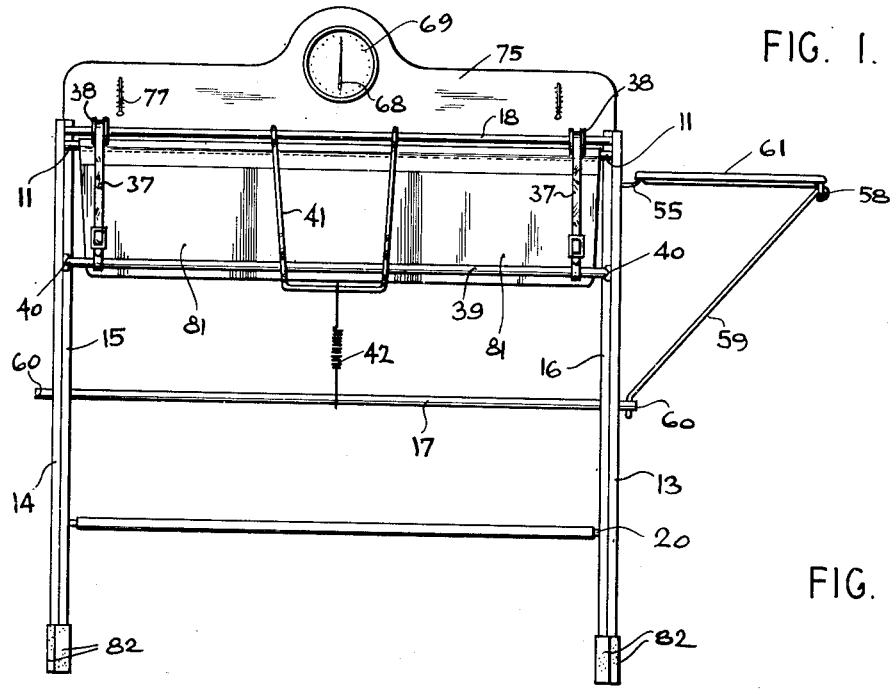
FIG. 1.
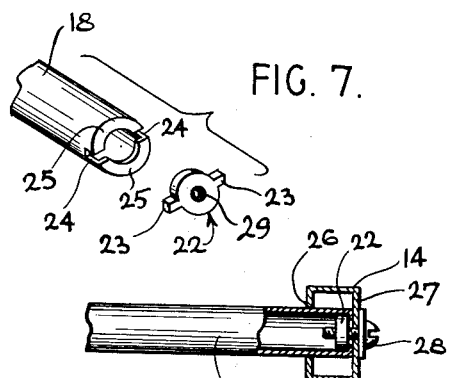
FIG. 7.
FIG. 8.
FIG. 6.
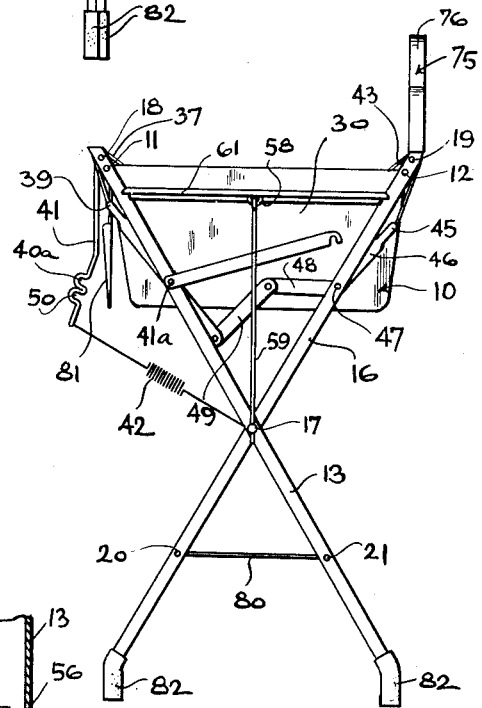
FIG. 2.
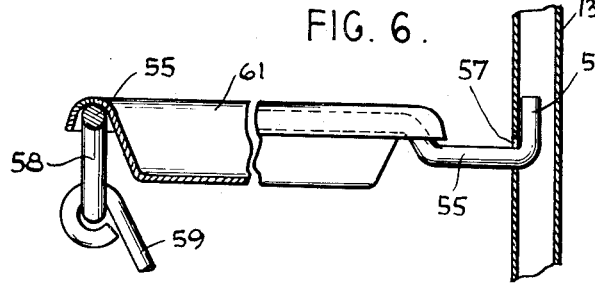
INVENTOR.
GEORGE B. HANSBURG
BY Edward Thomas
ATTORNEY Nov. 10, 1953  G. B. HANSBURG  2,658,204
BATHTUB
Filed June 13, 1949  2 Sheets-Sheet 2
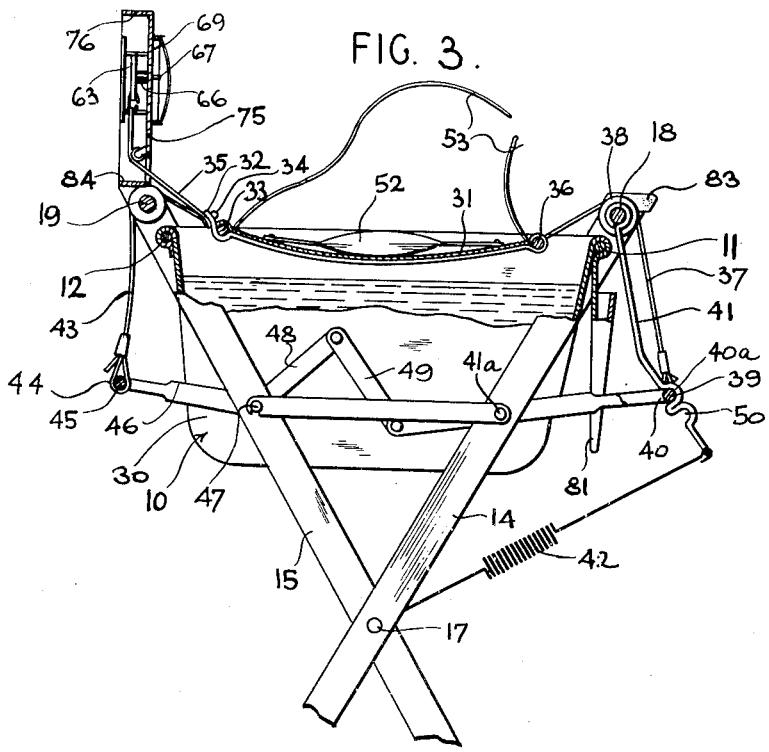
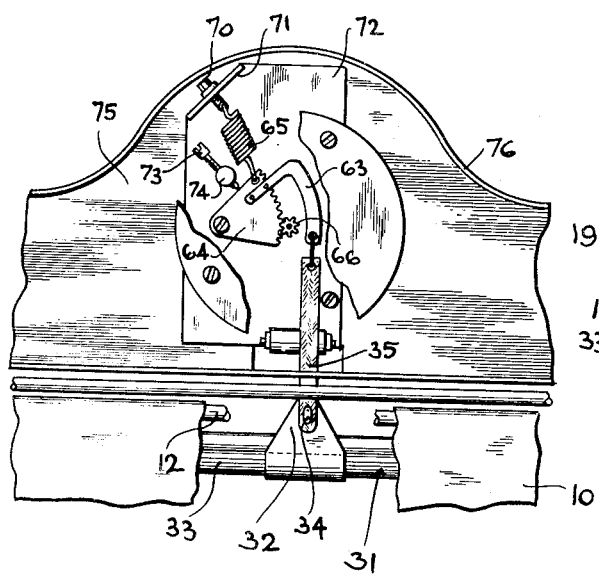
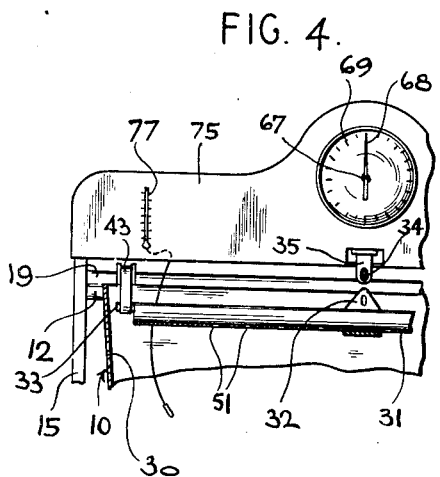
*INVENTOR.*
GEORGE B. HANSBURG
BY Edward Thomas
ATTORNEY.

Patented Nov. 10, 1953

2,658,204

UNITED STATES PATENT OFFICE 2,658,204

BATHTUB

George B. Hansburg, Walker Valley, N. Y.

Application June 13, 1949, Serial No. 98,687

5 Claims. (Cl. 4—177)

This invention relates to bath tubs with weighing devices and is herein disclosed in some detail as embodied in a so-called baby canvas bath tub with an incorporated weighing device.

So-called canvas folding tubs for bathing babies are known and some have been produced with a rigid platform inside the tub upon which a baby may be rested while being dried or being dressed, but it is found that such platforms are so likely to tilt and the tubs were so collapsible that no satisfactory weighing device could be attached to them.

Moreover, generally the tubs were so constructed that the platform was normally at the back of the tub and the slippery, wet baby had to be lifted out (a hazardous operation) while the platform was set in the tub. Thus the baby had to be handled while wet and the platform added little to convenience in bathing the baby.

It has been found that weighing devices so attached often show weight incorrect by several ounces or more and so seriously mislead a fond mother or a scientifically trained nurse.

Moreover, many forms of weighing devices prove unsatisfactory in unskilled hands when attached so as to be operated by such a platform as has hitherto been provided. Some devices have had to be too large to work effectively. Others have had to be carefully levelled or the baby carefully centered on the platform. Still others are easily deranged by unskilled handling.

According to the present invention the foregoing and other difficulties and objections are overcome and a combined tub and weighing device is provided which is fool-proof, which provides the necessary rigidity, which is of satisfactory lightness, is economical to build, and is rugged enough to withstand a great deal of abuse.

In the form shown in some detail, a so-called canvas tub of conventional form is suspended by horizontal rods connecting the tops of a pair of pairs of pivoted crossed legs. In the form of tub shown other rods usually connect the pairs of legs near their bottom ends to form a satisfactory frame.

In the form shown the platform is within the tub but supported independently of it, being for that reason carried by straps which may take the form of front straps attached to a front cross bail near its ends, and below the top of the tub and outside of it, and rear straps attached to a rear bail near its ends behind the tub and outside of it.

In the form shown the platform may be raised from its submerged position to either of two positions, one for dressing and one for weighing.

In thus raising or lowering the platform by the straps, the straps are shown as moving on idler rolls carried by the front and rear horizontal rods of the tub frame top. And the platform shown is carried by front and rear rods only, so that it may droop in the center.

In the weighing position the platform is shown as supported in front by the straps aforesaid, but the back edge is shown as then supported by a single central weighing strap, short enough to leave the other rear straps slack, so that the single central strap carries the whole weight not borne by the front straps.

In the form shown the central strap is attached to a toothed rack of a weight indicator, so that when a weight is set on the platform the rack is pulled down, against the tension of a suitable spring, and the teeth turn a toothed wheel. The toothed wheel is shown as turning a weight-indicating pointer to an extent governed by the spring.

To make the tension on the spring uniformly proportional to the weight, the central strap is shown as carried underneath a roller mounted on ball bearings beneath the rack so the pull is always unchanged by any friction and is in the identical direction, and the central strap is shown as reaching forward on an incline to the platform.

Since the platform is fastened to the front straps, and they are pulled to a uniform position by the front bail, the tension on the central strap is proportional to the weight on the platform.

The platform is shown as supported solely by front and back rods or bails so that it may sag slightly along the center line and thus always tend to hold the baby centrally of the platform. To properly utilize this sagging of the platform, the outer structure is shown as rigid.

To obtain the adequate rigidity of structure to effect accurate weighing, each pair of legs at each end of the tub are shown as adapted to be firmly held by substantial close fitting hooks, each pivoted on one leg of a pair and closely seizing a lug or projecting rivet on the other leg of the pair.

This rigid structure provides connections such that the slight shrinking or stretching of the front straps or central rear strap has little or negligible effect on the weight shown by the pointer, and the drooping of the center of the platform tends to uniformly center the baby every time it is weighed.

In the from shown the weight indicating pointer is mounted to turn on the front of a rigid splash board, which is shown as also carrying in protecting recesses an air-temperature thermometer at one side and a water-temperature thermometer at the other side. A Taylor type inside-outside window thermometer with a relatively large bulb connected by a long flexible tube to a vertical thermometer stem, has been found satisfactory for the water temperature thermometer.

A finger screw may set the pointer to the zero point, and a second finger screw may adjust the spring.

It will be noted that the mother who uses this tub avoids need for the extra expense of a weighing scale. She also avoids need for moving the baby to and from separate scales and thus avoids exposing the baby to unnecessary drafts.

To enable the tube structure to be light enough for the average mother to move with ease it may be constructed, for the most part of thin aluminum alloy tubing.

The crossed legs are preferably of rectangular alloy tubing, with open ends covered by thin long-skirted rubber caps, and they are advantageously cross-connected by thin aluminum alloy tubing ⅝ inch outside diameter. These tubing ends are best closed by brass washers having projecting lugs that fit in notches in the ends of the tube wall, so that when the projecting walls of the tube are spun down over the washer at each end a brass screw may be threaded safely and securely into the washer. It is found that such a tube with its closed ends may be of sufficient strength even though it weighs no more than six ounces although 34 inches long.

The rectangular tubes are of such rigidity that it has been found safe to provide small central openings in their flat sides so that a tray support may be hooked into them, thus enabling the mother or nurse with the much desired convenient shelf find soap and towel at the end of the tub. But no hooks project from the legs, thus liability to accident is greatly reduced.

The tub and weighing and dressing platform are readily made of suitable strong light plastic and the platform is preferably perforated to drain rapidly, marked with space to center baby for weighing and includes an air-filled head cushion.

Other features and advantages will hereinafter appear.

Fig. 1 shows the tub structure in front view.
Fig. 2 is an end view of the same.
Fig. 3 is an opposite end view partly in section.
Fig. 4 is a front view partly in section of the weighing connection and one end.
Fig. 5 is a rear view of the weighing connections.
Fig. 6 is a view in section showing how a shelf hooks on.
Fig. 7 is an exploded view of the end of a rod.
Fig. 8 shows the same assembled.

In the form shown a fabric or sheet flexible plastic tub proper 10 is held by being stitched around a front cross rod 11 and a rear cross rod 12, and the front cross rod 11 is shown as joining the tops of two legs 13 and 14 which slope rearwardly and downwardly.

The rear cross rod 12 is shown as joining the tops of two legs 15 and 16 which slope downwardly and forwardly to cross the legs 13 and 14, being pivoted on the cross-bar 17 which joins the outer legs 13 and 14 at the pivot point, as more fully explained below.

In the form shown, the device also includes an additional top front cross-bar 18 and top rear cross bar 19 which respectively join the legs 13 and 14 and 15 and 16.

The legs 15 and 16 are shown as joined, about half-way between their bottoms and the pivot bar 17 by a cross-bar 20, and the legs 13 and 14 are shown as joined at about the same height by a cross-bar 21.

In the form shown the legs 13, 14, 15 and 16, are in the form of thin rectangular tubes of aluminum alloy and the cross-bars are shown as thin aluminum alloy tubes.

It is found that sufficient stability in the device for all ordinary use is obtained when the cross-bars 18 and 19 (for example) are united to the legs by the type of joint shown in Figs. 7 and 8. In these figures, for example, the tubular cross-bar 18 is diagrammatically shown as terminating in a special form of steel or brass washer 22 having radially projecting lugs 23 adapted to seat themselves in radial cuts 24 in the sides of the tube 18.

The projecting ends 25 of the tube wall are then sweated down over the outer face of the washer 22. The joint is made by passing the end of the rod 18, for example, through a close fitting opening in the near wall 26 of the hollow leg 14, so that it lies against the interior of the further wall 27 and then threading a broad-headed screw 28 into the threaded central opening 29 of the washer so that its head seizes the wall 27 firmly. If desired a brass washer may be interposed between the head of the screw 28 and the wall 27 to spread the grip of the screw.

Such a joint gives great rigidity to the frame of the device. While the cross-bars 11 and 12 are shown with such joints, the device has been found satisfactory when those bars lack the washer 22 and screw 28 and are held solely by lying in close-fitting openings in the near wall of the leg and close against the inner face of the further wall of the leg.

The tub 10 proper is adapted to fold up its end walls 30, and is kept stretched in shape by the structure which includes holding hooks described below.

The baby is usually laid upon a stretched sheet or platform device 31 shown as held above the water in the tub in Fig. 3, and then weighed, bathed, dried and dressed.

To support the platform device in the Fig. 3 position the device was supported at the rear by a tab 32 located centrally of the rear edge rod 33 holding the sheet platform 31 extended, and the tab 32 is shown as hooked to an oblong stud 34 on a strap 35 forming part of a spring weighing device (Fig. 5).

The front rod 36 of the sheet 31 is shown as supported at each end by a tape device 37, running over a roller 38 and caught around a front bail 39. The bail 39 is shown as round and, for convenience in drawing, as solid and bent around at 40 at each end so that it is pivoted at 41a on the side of one of the front legs 13 and 14.

Thus when the baby lies on the sheet 31 for weighing it is supported at the center by the tab 32 and the front tape device 37 at each end. Since there are no end rods, the baby tends to center itself in the shallow sagging of the sheet 31.

All the foregoing operation and description is based on the holding of the bail 39 in the top locking loop 40a of the locking bail 41 pivoted on the bar 18, and held in locking position by a long spring 42 anchored in the pivot bar 17.

When the baby has been weighed the oblong stud 34 is turned to release the tab 32, allowing the sheet 31 to fall slightly so that it is then supported by a tape device 43 attached to each end of the rod 33. The tape devices 43 allow the sheet 31 to drop very slightly because the ends 44 of the tapes are caught on a rear bail 45 having ends 46 curved so as to be pivoted at 47 on the rear legs 15 and 16.

The bail ends 46 are extended as bell cranks 48 beyond the pivots 47 and are shown as connected by links 49 to rearward extensions of bail 39 so that when the bail 39 is raised or lowered the bail 45 is almost equally raised or lowered, with the result that the sheet 31 rises and falls almost equally at the front and back and is approximately level. The term approximate is used because it is found useful to have the front bail 39 swing on longer arms than the rear bail.

When the tab 32 has been released, the tape devices 43 support the rear of the sheet 31. The locking bail 41 may be then swung out releasing the bail 39 and that bail rises allowing the front tape device 37 to slide over the rollers 38 under the weight of the baby and the rear tape devices slide in unison by reason of the same weight and the connecting link 49. The bail 39 serves as a handle to allow the sheet 31 to fall slowly and gently.

When the baby has been bathed the bail 39 may be depressed, carrying down the bail 45, so that the front tapes 37 and rear tapes 43 raise the sheet 31. In the device shown they raise it clear of the water and hold it there by catching in a second loop 50 of the locking bail 41.

Thus the baby is lifted clear of the water without being touched by any hand. The sheet 31 is preferably perforated as at 51 in an area indicating the proper position of the baby for weighing it, so water drains off, and may leave the sheet 31 substantially dry if made of suitable water-repellant material.

The baby's head preferably has been resting on a shallow air cushion 52 to lift it safely in the water and, if desired, held by a releasable strap 53 attached to the sheet 31.

Th baby can now be dried and dressed without lifting it off the sheet 31, so all the danger of the slipping of hands on a wet baby is eliminated.

The rigidity referred to above may easily be obtained by hooks at each end pivoted on the pivots 41a adapted to catch firmly on pivots 47, and may be equally obtained by shelf supports 55 having hooks 56 adapted to enter small openings 57 in the upper parts of the legs 13 and 16 or 14 and 15 and thus lock the legs against collapsing.

The supports 55 may form a heavy wire frame having a central loop 58 in which hangs a wire rod 59 adapted to be inserted in a projecting stud 60 formed as an extension of the screw at the joint of the pivot rod 17 with the legs on either side. The shelf 61 carried by the supports 55 may be a standard metal form with turned over edges to fit on the frame 55, 58, 55.

The weighing device is connected to the strap 35 above a ball bearing roller under and around which the strap passes so that it always pulls on the arm 63 of the weighing device at the same angle.

The arm 63 is shown as an extension of a pivoted toothed quadrant 64, normally drawn up by a spring 65, and meshing with a pinion 66 on the shaft 67 of a pointer 68.

The shaft 67 passes through the rigid metal splash board 75 fast to the tops of the legs 15 and 16, so the pointer is in front and easily read on its graduated dial 69.

The spring 65 may be readily adjusted by a thumb screw 70 turning in a standard 71 on the mounting 72 of the weighing mechanism, and the quadrant 64 may be adjusted by a thumb screw 73 on another standard 74 on the mounting 72.

The mounting 72 may be a small brass or steel plate of adequate rigidity mounted on the splash board 75 which may be thin aluminum sheet with deep turned over flange 76 to give it rigidity yet lightness.

A rigid splash board gives adequate protection to an air thermometer and a water thermometer 77 sunk in a suitable depression and having a bulb adapted to lie on or near the bottom of the tub connected to the usual glass tube indicator by a well-known type of flexible connection.

The lower cross rods 20 and 21 may carry, sewed to them, as the flexible tube fabric is sewed to its rods, a fabric shelf 80, and the tub fabric may be extended down behind the bail 41 to form depending pockets 81.

It is found that the structure thus described, without its detachable shelf 61 and shelf frame 55, may weigh no more than 14½ pounds and yet withstand ordinary domestic wear and tear.

The open bottoms of the rectangular legs are shown as closed by rubber caps 82 which fit down over the sides of the legs which may be bent to fit flat on the floor.

The tops of the legs 13 and 14 may be closed by similar caps 83, and the bottom flange 84 of the splash board 75 may close the tops of the legs 15 and 16.

Having thus described certain embodiments of the invention, what is claimed is:

1. The combination with a tub body of a frame in which the tub is supported, a platform device within the tub, flexible straps attached to the front of the platform device and carried over the front of the tub, flexible straps attached to the rear of the platform device and carried over the rear of the tub, a front bail to which the front straps are attached, a rear bail to which the rear straps are attached, linkages connecting the bails so they rise and fall together, a weighing device on the frame behind the tub, means for supporting the rear of the platform by the weighing device, and a holding device adapted to hold the platform in one position to support the platform by all the straps and to hold the platform in another position to relieve the rear straps of load and to support it by the front straps and by said means for supporting it by the weighing device.

2. The combination with a tub body, of a frame in which the tub is supported, a platform device within the tub, strap devices supporting the front of the platform, strap devices supporting the rear of the platform, a weighing device carried by the frame, linkages for moving the front supporting devices and the rear supporting devices in unison to raise and lower the platform device, and means connected to the weighing device relieving the rear supporting devices of their load when the platform device is lowered.

3. The combination with a tub body, of a frame in which the tub is supported, a platform device within the tub, strap devices supporting the front of the platform, strap devices supporting the rear of the platform, a weighing device carried by the frame, linkages for moving the front supporting devices and the rear supporting devices in unison to raise and lower the platform device, and normally disconnected means connected to the weighing device relieving the rear supporting devices of their load when the platform device is lowered.

4. The combination with a tub body, of a frame in which the tub is supported, a platform device within the tub, and normally tending to sag, strap devices drawing on and supporting the front of the platform, strap devices drawing on and supporting the rear of the platform, a weighing device carried by the frame, linkages for moving the front supporting devices and the rear supporting devices in unison to raise and lower the platform device, and means connected to the weighing device relieving the rear supporting devices of their load when the platform device is lowered.

5. The combination with a tub body, of a frame in which the tub is supported, a platform device within the tub, and normally tending to sag, strap devices drawing on and supporting the front of the platform, strap devices drawing on and supporting the rear of the platform, a weighing device carried by the frame, connections including a front and a rear bail, and linkages joining them for moving the front supporting devices and the rear supporting devices in unison to raise and lower the platform device, and normally disconnected means connected to the weighing device relieving the rear supporting devices of their load when the platform device is lowered.

GEORGE B. HANSBURG.

References Cited in the file of this patent
UNITED STATES PATENTS

| Number | Name | Date |
|---|---|---|
| 1,408,553 | Wedemann | Mar. 7, 1922 |
| 1,802,147 | Hansburg | Apr. 21, 1931 |
| 2,108,398 | Allen | Feb. 15, 1938 |
| 2,499,094 | Greenbaum | Feb. 28, 1950 |